(12) United States Patent
Chang et al.

(10) Patent No.: US 11,461,076 B2
(45) Date of Patent: Oct. 4, 2022

(54) METHOD FOR EDITING CONTINUAL VERTICAL LINE OF VISUAL PROGRAMMING LANGUAGE

(71) Applicant: Delta Electronics, Inc., Taoyuan (TW)

(72) Inventors: Yung-Liang Chang, Taoyuan (TW); Mao-Hua Cheng, Taoyuan (TW); Kuei-Fu Liu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 4 days.

(21) Appl. No.: 17/033,935

(22) Filed: Sep. 28, 2020

(65) Prior Publication Data
US 2021/0149642 A1 May 20, 2021

(30) Foreign Application Priority Data

Nov. 15, 2019 (CN) .......................... 201911118938.2

(51) Int. Cl.
*G06F 8/33* (2018.01)
*G06F 8/34* (2018.01)

(52) U.S. Cl.
CPC . *G06F 8/33* (2013.01); *G06F 8/34* (2013.01)

(58) Field of Classification Search
CPC .................................... G06F 8/34; G06F 8/33
See application file for complete search history.

(56) References Cited

U.S. PATENT DOCUMENTS

| | | | | |
|---|---|---|---|---|
| 6,484,189 B1 * | 11/2002 | Gerlach, Jr. | ............. | G09B 7/04 715/201 |
| 2006/0075352 A1 * | 4/2006 | Burke | ..................... | G06F 9/451 715/763 |

(Continued)

FOREIGN PATENT DOCUMENTS

| | | |
|---|---|---|
| CN | 103559727 A | 2/2014 |
| JP | 2009259082 A | 11/2009 |
| JP | 4879134 B2 | 2/2012 |

OTHER PUBLICATIONS

Office Action dated Sep. 7, 2020 of the corresponding Taiwan patent application No. 108141503.
Yu-Kai Chang et al, Application of Programmable Controller PLC, Chapter 2 of the teaching material for Software Editing and Operation of Programmable Controller, http://webftp.nkut.edu.tw/~079129/1072/%E6%95%99%E6%9D%90/PLCIPPT/CH02.ppt, uploaded Sep. 19, 2018, New Wun Ching Developmental Publishing Co., Ltd, published Jun. 15, 2018, pp. 8-72.

(Continued)

*Primary Examiner* — Wei Y Zhen
*Assistant Examiner* — Amir Soltanzadeh
(74) *Attorney, Agent, or Firm* — Chun-Ming Shih; HDLS IPR Services

(57) ABSTRACT

A method for editing continual vertical line of visual programming language includes following steps: entering an editing mode; selecting a source node as a current node from a serial-parallel graphic where the source node is an endpoint of one of a plurality of normal blocks in the graphic; calculating and displaying one or more candidate nodes around current node; connecting the current node to any one of the candidate nodes for converting the connected candidate node into a connected node; setting the connected node as the current node for continually calculating, displaying, connecting to one or more candidate nodes before exiting the editing mode; generating a continual vertical line according to the source node and the one or more connected nodes when exiting the editing mode; modifying the serial-parallel relationship among the plurality of normal blocks in the graphic and updating the graphic according to the continual vertical line.

15 Claims, 12 Drawing Sheets

(56) References Cited

U.S. PATENT DOCUMENTS

| | | | | |
|---|---|---|---|---|
| 2006/0259452 | A1* | 11/2006 | Gibbons | G06Q 10/06 |
| 2007/0018980 | A1* | 1/2007 | Berteig | G06T 17/005 |
| | | | | 345/426 |
| 2013/0074024 | A1* | 3/2013 | Chase | G06F 30/398 |
| | | | | 716/112 |
| 2014/0040792 | A1* | 2/2014 | Kodosky | G06F 8/34 |
| | | | | 715/762 |
| 2014/0108463 | A1* | 4/2014 | Gagliardi | G06F 11/3495 |
| | | | | 707/797 |
| 2014/0143736 | A1* | 5/2014 | Huang | G06Q 10/06 |
| | | | | 715/854 |
| 2017/0046127 | A1* | 2/2017 | Fletcher | H04L 41/069 |
| 2017/0286502 | A1* | 10/2017 | Bar-Or | G06F 16/2423 |
| 2019/0028360 | A1* | 1/2019 | Douglas | H04L 41/22 |

OTHER PUBLICATIONS

Office Action dated Apr. 23, 2021 of the corresponding Taiwan patent application No. 108141503.

Search Report dated Apr. 13, 2021 of the corresponding European patent application No. 20199535.4.

\* cited by examiner

Q = {L0,L4}

Q = {L0,L4,L6,L11}

Q = {L4,L6,L11}

Q = {L6,L11}

Q = {L11}

Q = {L0,L4,L6}

METHOD FOR EDITING CONTINUAL VERTICAL LINE OF VISUAL PROGRAMMING LANGUAGE

BACKGROUND OF THE INVENTION

1. Technical Field

The present invention relates to an editing method of visual programming language, especially to a method for editing continual vertical line of visual programming language.

2. Description of Prior Art

Generally, user may edit the logic connection relationship (such as serial or parallel relationship) among virtual industrial control equipment by visual programming language editor. Therefore, user can easily determine the combination of various industrial control equipment for automatic operation and set up desired system architecture.

The current visual programming language editor, such as ladder diagram editor, mainly assigns a user command to an operation for editing. User is allowed to add only one vertical line at one time when user wants to changes the connection relationship among the various device blocks (also referred to as normal block, and corresponding to various virtual equipment). Namely, user needs to send plurality of commands successively when he/she needs to construct a plurality of vertical lines. This is really troublesome.

In the operation of current editor of visual programming language, after all of the required normal blocks are added to the graph, user cannot construct a continual vertical line across multiple nodes by using only one operation to fast adjust the connection relationship of multiple normal blocks. Due to above limitation, it is hard for user to construct a complicated graph with lots of normal blocks and complex connection relationship.

SUMMARY OF THE INVENTION

One of objects of the present invention is to provide a method for editing continual vertical line of visual programming language to allow user to construct a continual vertical line across multiple nodes by using only one operation, thus fast adjust the connection relationship of multiple normal blocks and update the graph.

Accordingly, the present invention provides a method for editing continual vertical line of visual programming language and applied to an editor. The method comprise: entering an editing mode; obtaining a source node on the serial-parallel graph comprising a plurality of normal blocks and the source node being an endpoint of one of the normal blocks; calculating and displaying at least one candidate node around the current node wherein the at least one candidate node is an endpoint of at least one of the normal blocks around the current node; connecting the current node to one of the at least one candidate nodes; converting the connected candidate node into a connected node; determining whether the editor exits the editing mode; setting the connected node as the current node and continually calculating, displaying and connecting one or more candidate node before exiting the editing mode; generating a continuous vertical line connecting the source node and at least one of the connected nodes when exiting the editing mode; and modifying a serial-parallel relationship of the normal blocks based on the continuous vertical line and updating the serial-parallel graph.

By above editing method of the present invention, user only needs one-time operation to directly generate a continuous vertical line in graph, thus fast modify the connection relationship among normal blocks by using the continuous vertical line and update the graph at the same time. User may use the editor of visual programming language more efficiently.

DETAILED DESCRIPTION OF THE INVENTION

Figure 1A:
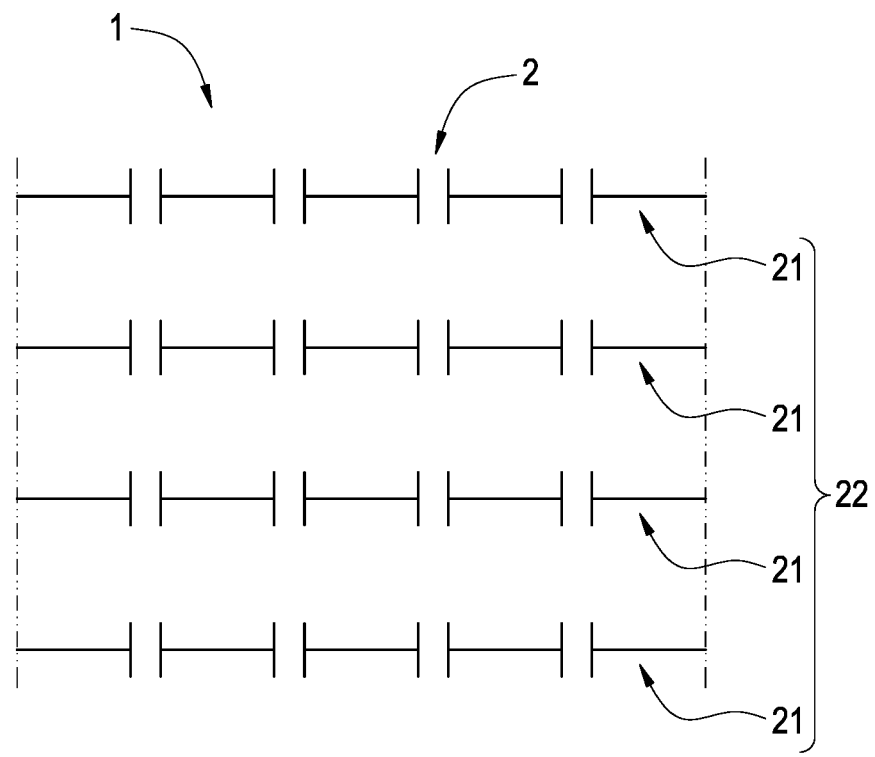
FIG. 1A shows the first construction operation for the continual vertical line according to the first embodiment of the present invention.

Reference will now be made to the drawing figures to describe the present disclosure in detail. It will be understood that the drawing figures and exemplified example of present disclosure are not limited to the details thereof.

The present invention provides a method for editing continual vertical line of visual programming language (hereinafter briefed as editing method), and the editing method is applied to editor of all kinds of visual programming languages and the editor is run on a computer.

Figure 1B:
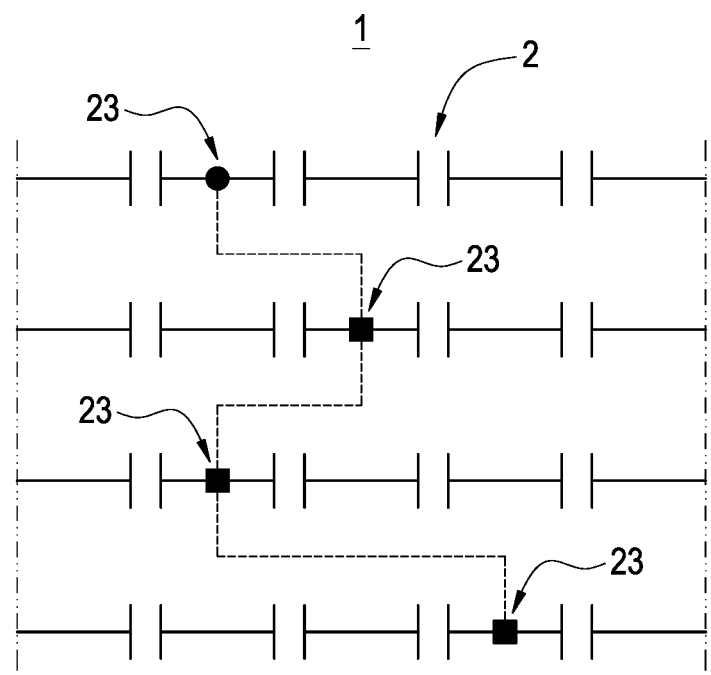
FIG. 1B shows the second construction operation for the continual vertical line according to the first embodiment of the present invention.
Figure 1C:
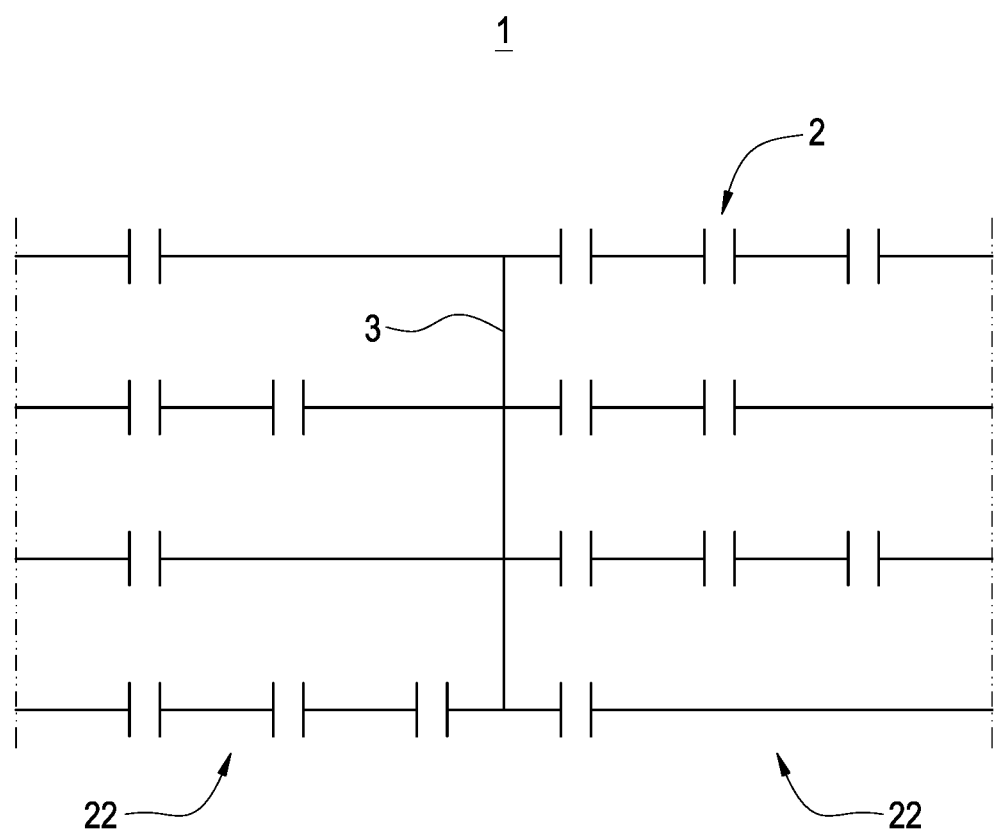
FIG. 1C shows the third construction operation for the continual vertical line according to the first embodiment of the present invention.

Refer now to FIGS. 1A, 1B, and 1C, which respectively show the first construction operation, the second construction operation and the third construction operation of the first embodiment of the present invention.

As shown in FIG. 1A, after user operates computer and runs the visual programming language editor on the computer, user can operate the editor and add one or more normal block 2 into the editor with the editing tools (not shown) of the editor, and construct a serial-parallel graphic (hereafter briefed as graph 1) with the normal blocks 2.

More specifically, after multiple normal blocks 2 are added to the editor, user may construct a continue block 21 with serially-connected blocks and construct a branch block 22 with the parallel-connected continue blocks 21.

As shown in FIG. 1B, according to one aspect of the present invention, user may operate human machine interface such as mouse, keyboard or touch pad of the computer to operate the editor to connect the multiple nodes 23 in graph 1, where each of the nodes 23 is corresponding to an endpoint of each normal block 2. It should be noted that, according to the present invention, user may complete the connection of the multiple nodes 23 in graph 1 by one operation (for example user just operates the mouse, keyboard or touch pad of the computer for one time).

As shown in FIG. 1C, after user completes the connection of the multiple nodes 23 in graph 1 by one operation, the editor may generate a continual vertical line 3 according to the multiple connected nodes 23 and modify the seral-parallel relationship of the multiple normal blocks 2 in the graph 1 based on the continual vertical line 3. The editor further updates the graph 1 and displays the updated graph 1.

In the present invention, user only needs one operation to construct a continuous vertical line 3 across multiple nodes 23 to complete the work, where prior art editor needs successive and multiple commands.

More particularly, as shown in FIG. 1C, after the continuous vertical line 3 is generated by the editor according to user operation, the editor may re-organize the graph 1. Therefore, the normal blocks 2 on the left side of the continuous vertical line 3 are re-organized as a new branch block 22, the normal blocks 2 on the right side of the continuous vertical line 3 are also re-organized as a new branch block 22, and the editor parallel connects the two new branch blocks 22. Finally, the graph 1 is updated according to the new seral-parallel relationship of the updated normal blocks 2.

As shown in FIGS. 1B and 1C, the continuous vertical line 3 comprises multiple vertical line segments. However, in the present invention, user only needs one operation to directly generate the continuous vertical line 3 instead of sending successive commands (multiple operations), thus greatly enhance the convenience of the editor.

It should be noted that even the present invention is exemplified with ladder diagram editor in FIGS. 1A to 1C, however, the scope of the present invention is not limited by this specific example.

Figure 2:
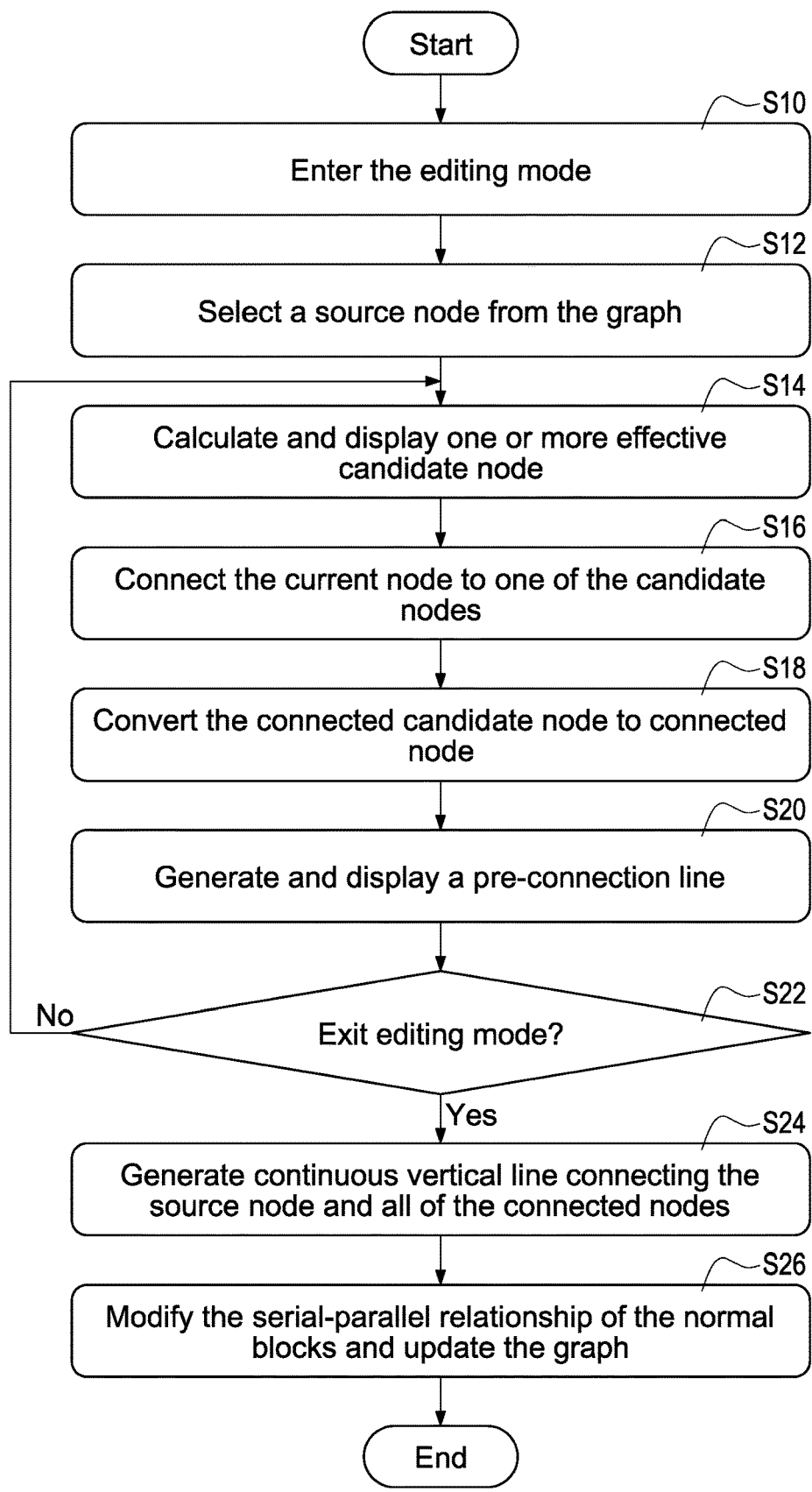
FIG. 2 shows the editing flowchart according to the first embodiment of the present invention.

FIG. 2 shows the editing flowchart according to the first embodiment of the present invention. FIG. 2 discloses the specific editing steps of the editing method of the present invention. After the visual programming language editor executes the steps shown in FIG. 2, the editor may modify the serial-parallel relationship of the normal blocks 2 of the graph 1 similar to the examples shown in FIGS. 1A to 1C and updates the graph 1 as well as re-displays the updated graph 1.

At first, the editor receives external operation from user (such as the first external operation) to enter the editing mode (step S10). In this embodiment, the user may operate the editor to add normal blocks 2 of desired number and desired types in graph 1 and then operate the editor to enter the editing mode to generate the continuous vertical line and to modify the serial-parallel relationship of the normal blocks 2 of the graph 1 according to the continuous vertical line 3 as well as to update the graph 1.

After the editor enters the editing mode, the user may operate the computer (for example operating the mouse, the keyboard or the touch pad) to select a source node (or referred to as start node) from the graph, where the source node is the endpoint of any normal block 2 in the graph 1 (S12). After the step S12, the editor sets the user-selected source node as the current node and generates the continuous vertical line 3 from the current node. In this embodiment, the current node is the current position of the cursor (such as mouse pointer) hovering in the screen of the editor, where the cursor is controlled by mouse, keyboard or touch pad.

It should be noted that the editor may add the current position of the source node to a queue (not shown) after the source node is confirmed, thus the position of the source node of the continuous vertical line 3 can be recorded, which will be detailed later.

After step S12, the editor may calculate one or more effective candidate node around the current node and mark the candidate node on the graph 1 with specific symbol (step S14). In this embodiment, the candidate node is the end point of one or more normal block 2 around the current node. More particularly, the effective candidate node in this embodiment is the node that will not cause short circuit of any normal block when user generates a connection line connecting the current node and the effective candidate node.

For example, if ten nodes are around the current node and there are three nodes causing short circuit of any normal block 2 after they are connected with the current node, the editor will mark the seven nodes, which will not cause short circuit of any normal block, on the graph as the candidate nodes.

It should be noted that the editor may monitor the operation of user (such as monitor the current location of the cursor), then calculates and displays one or more candidate nodes around the current node only when the cursor moves from the current node and the moving distance of the cursor is larger than a threshold value, thus prevent the erroneous click (operation) of user.

Besides, when the editor monitors user operation, the editor further determines the moving direction of the cursor moving from the current node. In this embodiment, the editor only calculates and displays one or more candidate nodes above the current node when the moving direction is upward, and only calculates and displays one or more candidate nodes below the current node when the moving direction is downward. Therefore, the editor can prevent from displaying excessive candidate nodes, which will confuse the user.

After the step S14, the editor already displays one or more effective candidate nodes, which is connectable, on the graph 1 and the editor may receive again the external operation of user (such as the second external operation) to connect the current node to one of the displayed candidate nodes (step S16).

For example, if the computer equipment currently operated by user is computer mouse, then the user may drag the mouse to move the cursor to the source node (namely the current node), press the left button of the computer mouse, and drag the cursor to the location of any one candidate node from the source node, thus connect the source node (namely the current node) to the candidate node.

For another example, if the computer equipment currently operated by user is keyboard, then the user may move the cursor to the location of the current node by arrow key and then press special function key (or shortcut key) to lock the source node. Afterward, the user may move the cursor to the location of any one candidate node from the source node by operating the arrow key, thus connect the source node to the candidate node.

However, the above description is only for explaining the embodiments of the present invention and is not limitation for the scope of the present invention.

After user connects the current node to any of the candidate nodes by operating the mouse, keyboard or touch pad, the editor converts the connected candidate node to connected node (step S16).

It should be noted that the editor adds the location of the connected node to the queue when any candidate node is converted to connected node. Therefore, the location of the nodes passed by the continuous vertical line 3 and/or the location of the end node can be recorded.

In one embodiment, the editor uses dashed line to display one or more effective candidate node and uses solid line to display the connected node. In another embodiment, the editor uses a first color (such as green) to display one or more effective candidate node and uses a second color (such as blue) to display the connected node. By above display manner to distinguish between effective candidate node and the connected node, user can easily generate the continuous vertical line 3 by using the editor.

It should be noted that the editor may selectively generate and display a pre-connection line (such as the pre-connection line 5 shown in FIGS. 3C and 3D) connecting the current node and the connected node in step S20 such that the user may easily visualize the construction of the continuous vertical line 3.

During the construction of the continuous vertical line, the editor continually determines whether it receives external operation (such as the third external operation) of user command to exit the editing mode (step S22). The editor sets the last connected node as the current mode before receiving the third external operation and then repeats the execution of steps S14 to S20 to continually perform the construction of the continuous vertical line 3.

In one embodiment, user may operate mouse to perform the construction of the continuous vertical line 3. In this embodiment, the first external operation keeps pressing the button of the computer mouse (namely, the editor enters the editing mode when user keeps pressing mouse button); the second external operation drags the mouse pointer by moving the mouse with mouse button being kept pressing (namely, the user drags the mouse to connect two nodes); the third external operation releases mouse button (namely, the editor exits editing mode when user release mouse button).

In another embodiment, the user operates the keyboard to perform the construction of the continuous vertical line 3. In this embodiment, the first external operation presses a special function key or shortcut key (namely, the editor enters the editing mode when user presses the special function key); the second external operation presses arrow keys (namely, the user moves cursor with arrow key to connect two nodes); the third external operation presses again the special function key (namely, the editor exits editing mode when user presses again the special function key).

The above examples are used for demonstrating the present invention and are not limitation of the present invention. For example, the editor may enter editing mode when user keeps pressing a specific key (such as ALT key), and exits the editing mode when the specific key is released. For another example, the editor may enter editing mode when user presses a specific button of mouse (such as left button), and exit the editing mode when the specific button is pressed again.

In other embodiment, the user may also operate the touch screen or touch pad of computer to perform the construction of the continuous vertical line 3. In this embodiment, the first external operation, the second external operation, and the third external operation may have similar operations with the previous examples, and the detailed description is omitted here for brevity.

In step S22, if the editor receives the third external operation to exit the editing mode, the editor generates the continuous vertical line 3 connecting the source node and all of the connected nodes in real time (step S24), modifies the serial-parallel relationship of the normal blocks 2 on the graph 1 at the same time, and then updates and displays the graph 1 (step S26).

It should be noted that in steps S24 to S26, the editor mainly obtains the source node and one or more connected node stored in the queue, and generates the continuous vertical line 3 based on those nodes. Besides, the editor further modifies the serial-parallel relationship of the normal blocks 2 based on the nodes stored in the queue and then updates the graph 1, which will be described in more detail later.

Refer also to FIGS. 3A to 3G, which show the first construction operation to the seven construction operation for the continuous vertical line according to the second embodiment. In the embodiment shown in FIGS. 3A to 3G, user uses single operation of mouse to generate a continuous vertical line, but this is not limitation of the present invention.

Figure 3A:
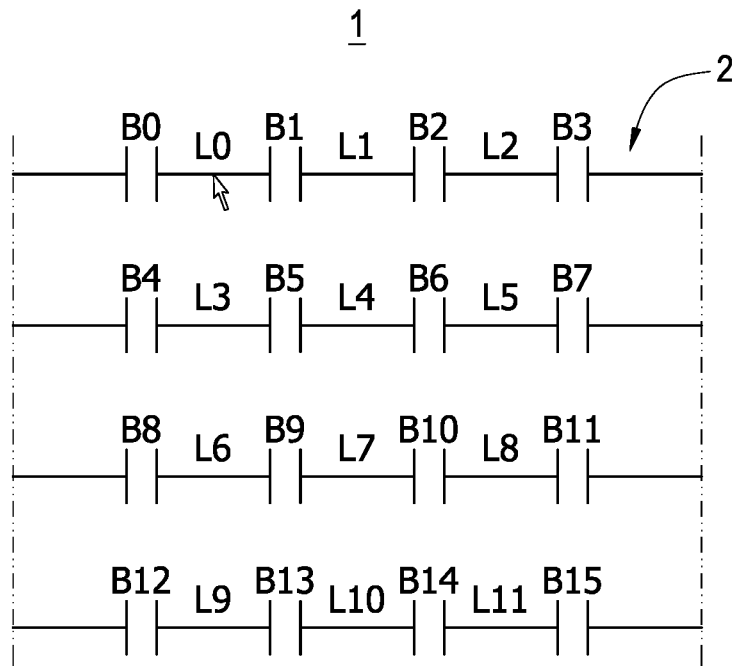
FIG. 3A shows the first construction operation for the continual vertical line according to the second embodiment of the present invention.

First as shown in FIG. 3A, user may operate the editing tool (not shown) of the editor to add a plurality of normal blocks 2 of desired number and type into the graph 1. In the embodiment shown in FIG. 3A, initially the graph 1 includes a first continue group (serial group) having normal blocks B0, B1, B2 and B3; a second continue group (serial group) having normal blocks B4, B5, B6 and B7; a third continue group (serial group) having normal blocks B8, B9, B10 and B11; and a fourth continue group (serial group) having normal blocks B12, B13, B14 and B15. Besides, the first continue group, the second continue group, the third continue group and the fourth continue group are parallel connected to each other.

As shown in FIG. 3A, each normal block 2 has endpoints L0-L11 at the serial junction. In the present invention, user may select the source node of the continuous vertical line 3 from the endpoints L0-L11, and the editor calculates one or more candidate node satisfying certain condition from the endpoints L0-L11. In other word, the editing method of the present invention can prevent the circuit error caused by user erroneously setting the continuous vertical line 3 on the normal block 2.

Figure 3B:
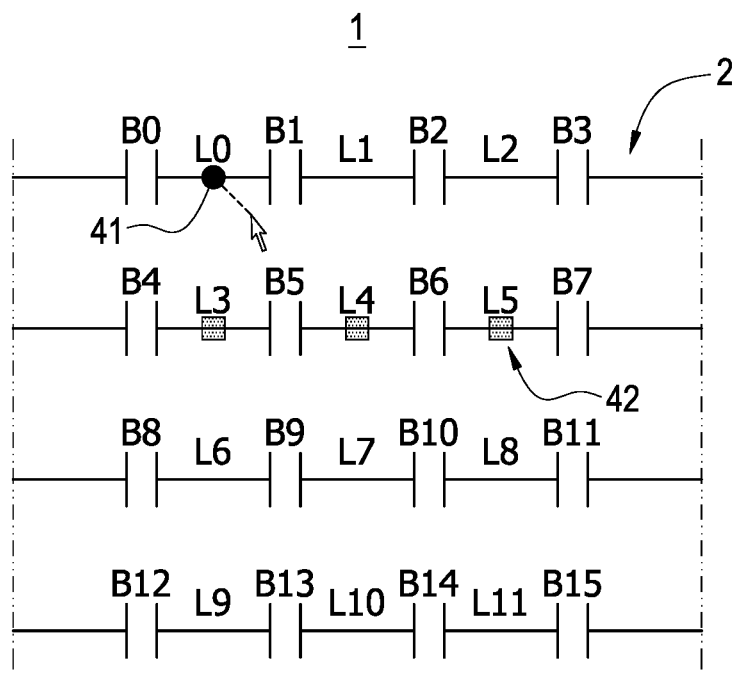
FIG. 3B shows the second construction operation for the continual vertical line according to the second embodiment of the present invention.

Afterward, as shown in FIG. 3B, user may operate mouse to control cursor in the screen to place the pointer at any endpoint, and then press mouse button (such as left button) to convert this endpoint to the source node 41. In this embodiment, user selects the endpoint L0 as the source node 41 and the editor stores the endpoint L0 in the queue Q.

After user selects a source node 41 the user keeps pressing mouse button to drag the pointer such that the pointer moves downward and the moving distance is larger than a threshold. At this time, the editor is triggered to calculate one or more effective candidate nodes 42 below the source node 41 and to display the one or more effective candidate nodes 42.

In one embodiment, the editor uses solid line to display the source node 41 and uses dashed line to display the candidate nodes 42. In another embodiment, the editor uses different colors to display the source node 41 and the candidate nodes 42 such that user may quickly distinguish between the two kinds of nodes.

Figure 3C:
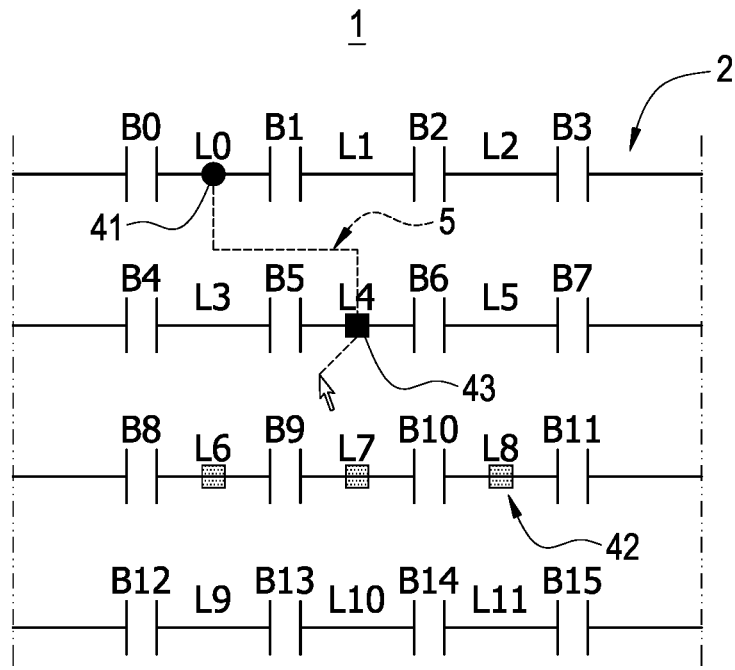
FIG. 3C shows the third construction operation for the continual vertical line according to the second embodiment of the present invention.

Afterward, as shown in FIG. 3C, user keeps dragging the pointer to move the cursor to one candidate node 42 (such as the endpoint L4 shown in FIG. 3C), then the editor adds the candidate node 42 (namely the endpoint L4) in queue Q and converts the candidate node 42 to connected node 43. When the pointer is further moved downward and the moving distance is larger than the threshold, the editor is triggered to calculate and display one or more effective candidate node 42 below the connected node 43.

In one embodiment, the editor displays the connected node 43 with solid line. In another embodiment, the editor uses different colors to display the candidate node 42 and the connected node 43, for example green for the candidate node 42 and blue for the connected node 43. In still another embodiment, the editor uses the same color or shape to display the candidate node 42 and the connected node 43.

Figure 3D:
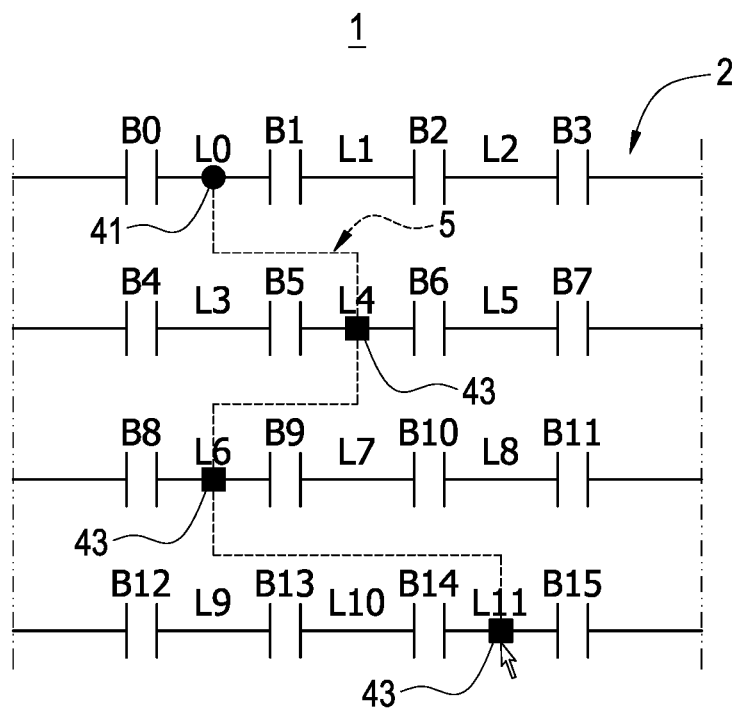
FIG. 3D shows the fourth construction operation for the continual vertical line according to the second embodiment of the present invention.

Afterward, as shown in FIG. 3D, the user may keep dragging the pointer to successively connect a plurality of candidate nodes 42 to convert those candidate nodes 42 into connected nodes.

Furthermore, as shown in FIGS. 3C and 3D, when user drags the pointer to connect two nodes, the editor displays a pre-connection line 5 for the two nodes on the graph 1 such that the user can quickly visualize the current connection status.

In the embodiment shown in FIG. 3D, user drags the pointer from the endpoint L0 and then passes the endpoint L4, the endpoint L6 and the endpoint L11. Therefore, the editor will set the endpoint L0 as the source node and then sequentially convert the endpoint L4, the endpoint L6 and the endpoint L11 into connected nodes 43. The editor also adds the endpoint L0, the endpoint L4, the endpoint L6 and the endpoint L11 into queue Q. When user releases mouse button to exit the editor from the editing mode, the editor may generate the continuous vertical line 3 based on the record of the endpoints in the queue Q.

Figure 3E:
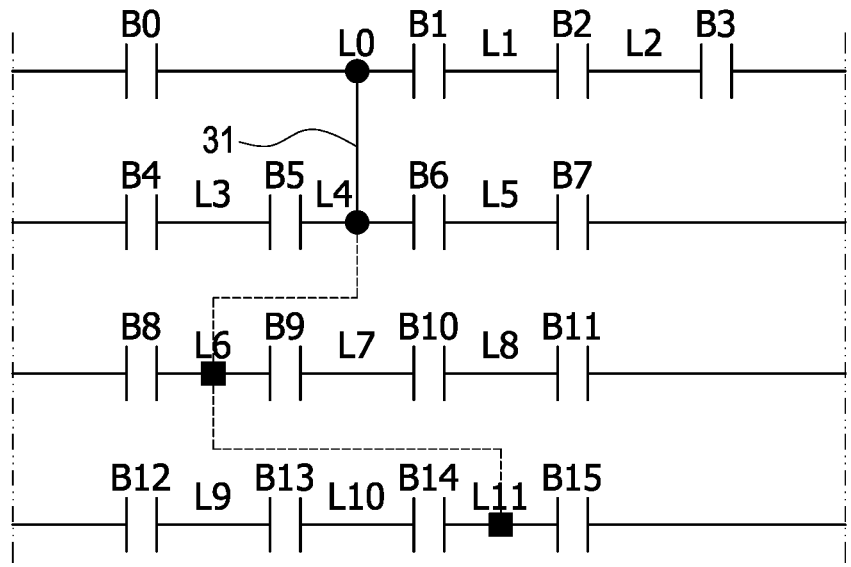
FIG. 3E shows the fifth construction operation for the continual vertical line according to the second embodiment of the present invention.

As shown in FIG. 3E, when user releases mouse button, the editor determines that user ends the editing task (namely exit editing mode), then the editor fetches the first two endpoints of the queue Q, namely, the endpoints L0 and L4 and removes the first endpoint of the queue Q, namely the endpoint L0.

Afterward, the editor constructs a first cut line 31 based on the endpoints L0 and L4, sets one or more normal block 2 on the left side of the start point (namely the endpoint L0) of the first cut line 31 as the first left group and sets one or more normal block 2 on the right side of the starting point of the first cut line 31 as the first right group. The editor further sets one or more normal block 2 on the left side of the end point (namely the endpoint L4) of the first cut line 31 as the second left group and sets one or more normal block 2 on the right side of the start point of the first cut line 31 as the second right group. Furthermore, the editor parallel connects the first left group with the second left group, parallel connects the first right group with the second right group, and finally serial connects the two parallel connection results through the first cut line 31.

As mentioned above, the editor removes the first endpoint (namely the endpoint L0) in the queue Q, therefore, only the endpoint L4, the endpoint L6 and the endpoint L11 remain in the queue Q after the first cut line 31 is constructed.

Figure 3F:
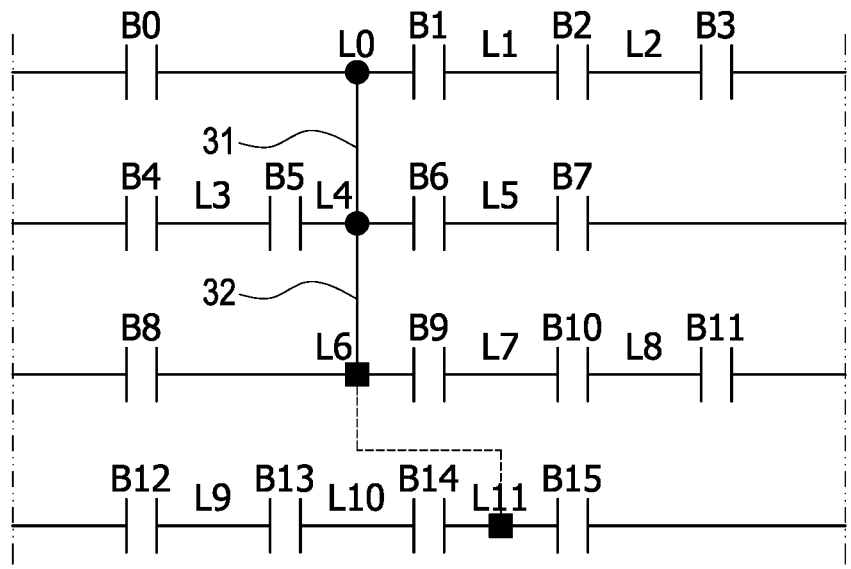
FIG. 3F shows the sixth construction operation for the continual vertical line according to the second embodiment of the present invention.

Afterward, as shown in FIG. 3F, the editor fetches again the first two endpoints (namely the endpoints L4 and L6) in the queue Q and removes the first endpoint (namely the endpoint L4) in the queue Q.

Afterward, the editor constructs a second cut line 32 based on the endpoints L4 and L6 and then updates the serial-parallel relationship of the normal blocks 2 with similar process mentioned above. As mentioned above, the editor removes the first endpoint (namely the endpoint L4) in the queue Q, therefore, only the endpoint L6 and the endpoint L11 remain in the queue Q after the second cut line 32 is constructed.

Figure 3G:
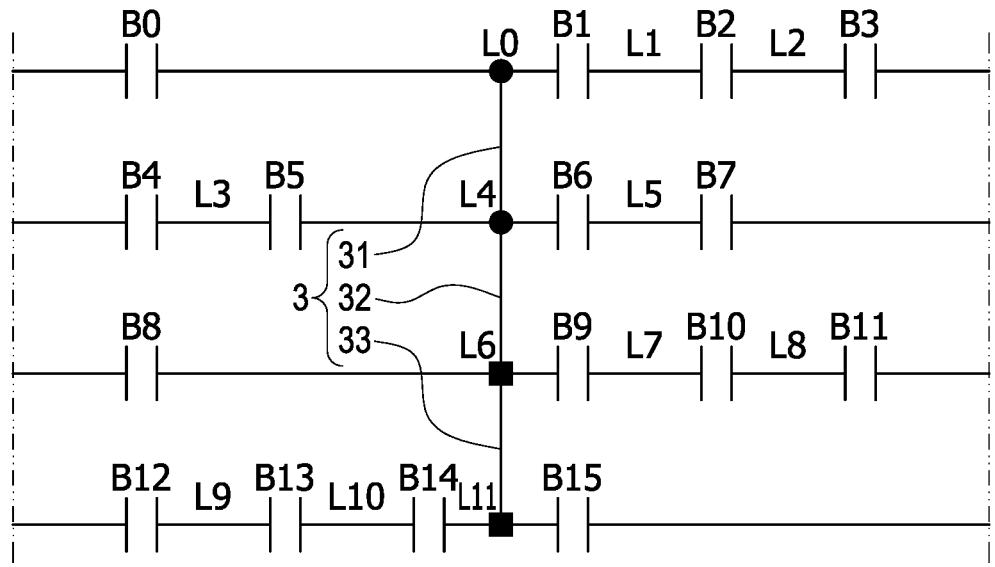
FIG. 3G shows the seventh construction operation for the continual vertical line according to the second embodiment of the present invention.

As shown in FIG. 3G, the editor fetches again the first two endpoints (namely the endpoints L6 and L11) in the queue Q and removes the first endpoint (namely the endpoint L6) in the queue Q after constructing the second cut line 32.

Afterward, the editor constructs a third cut line 33 based on the endpoints L6 and L11 and then updates the serial-parallel relationship of the normal blocks 2 with similar process mentioned above.

As mentioned above, the editor will remove the first endpoint in the queue Q (namely the endpoint L6) after constructing the third cut line 33. Therefore, only one endpoint L11 remains in the queue Q after constructing the third cut line 33. Because one endpoint cannot constitute a cut line, the editor will end the construction of the cut line and set the last endpoint L11 in the queue Q as the end node of the continuous vertical line 3. In this way, the editor may generate the continuous vertical line 3 by the first cut line 31, the second cut line 32 and the third cut line 33.

By the present invention, user may use single operation (such as the operation from pressing left button of mouse to releasing left button of mouse) in editing mode to generate a continuous vertical line 3 passing (connecting) a plurality of nodes, which is very convenient for user.

Figure 4:
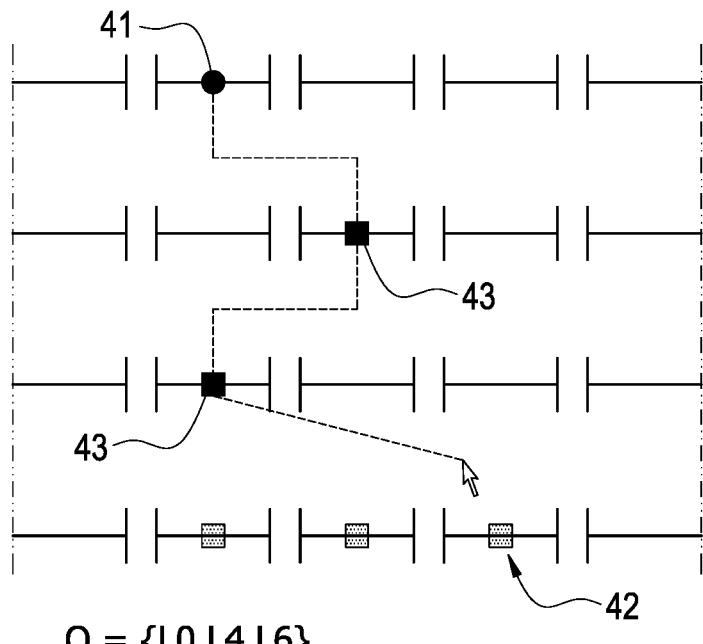
FIG. 4 is the schematic view showing the retreating of the vertical line according to the first embodiment of the present invention.

FIG. 4 is the schematic view showing the retreating of the vertical line. During the construction of the continuous vertical line 3 (namely the editor is still in the editing mode), the user may control the pointer backward at his disposal (namely moving the pointer toward the source node 41). When the editor determines that the pointer is moved toward the source node 41 and already leaves the connected node 43, the editor converts the connected node 43 into candidate node 42 as shown in FIG. 4 and then displays the converted candidate node 42 with other candidate node 42 on the graph 1.

As mentioned above, when a candidate node 42 is converted into a connected node, the editor will store the connected node (such as the endpoint L11) into queue Q. When user moves back the pointer to convert the connected node 43 into candidate node 42, the editor will remove the candidate node 42 (such as the endpoint L11) from the queue Q to render more flexibility to user for drawing.

Figure 5A:
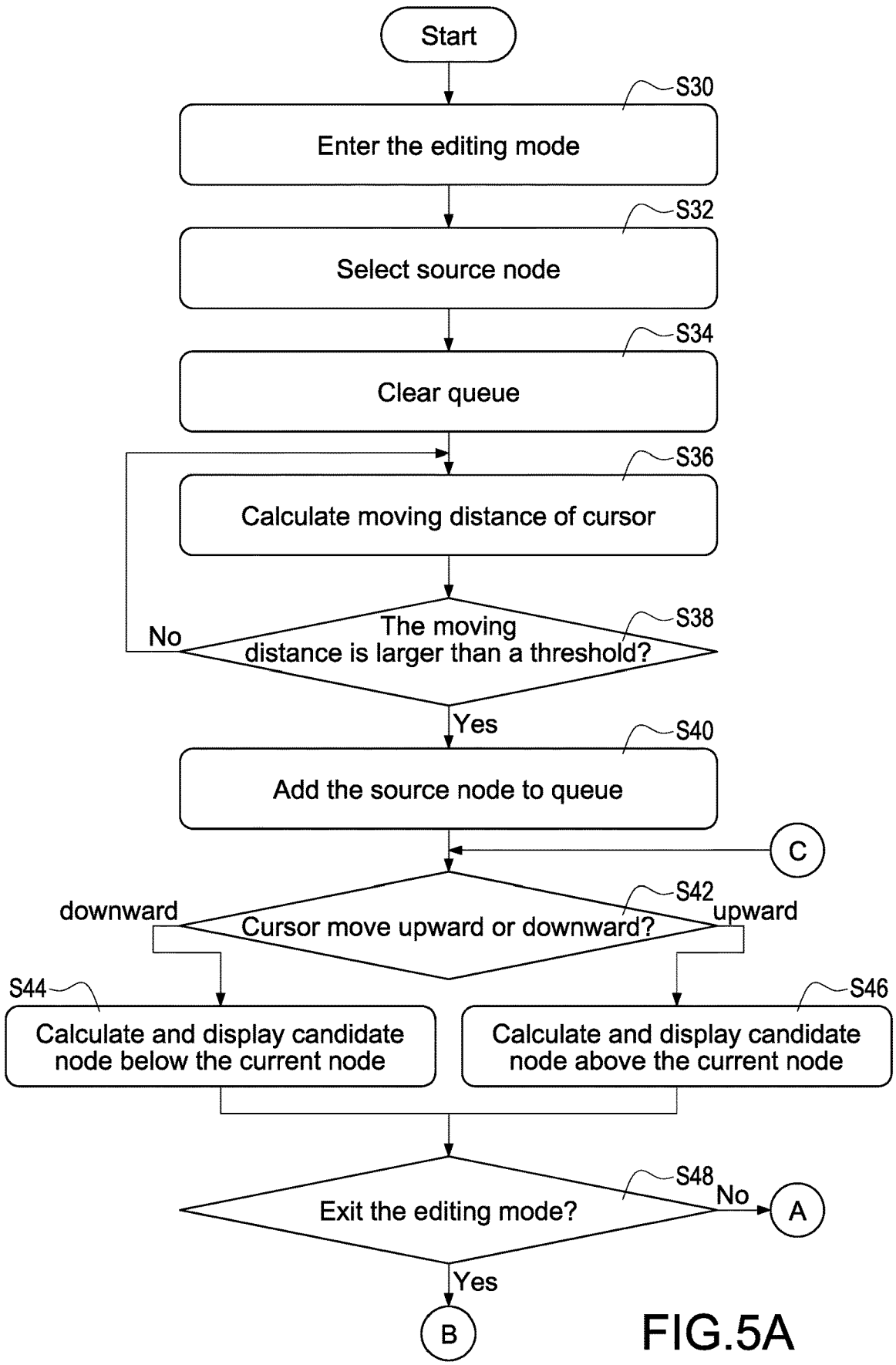
FIG. 5A is the first part of the editing flowchart according to the second embodiment of the present invention.
Figure 5B:
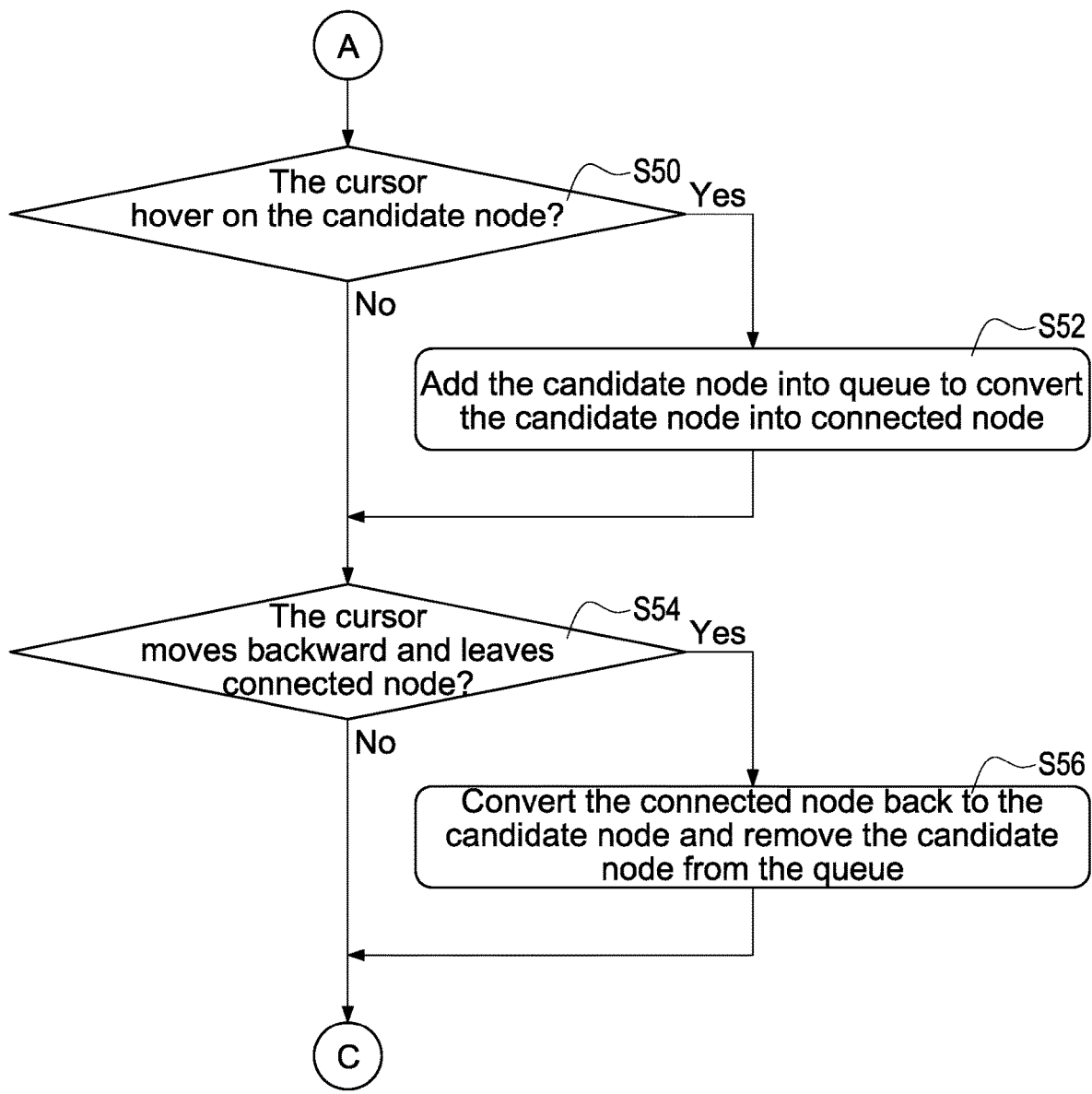
FIG. 5B is the second part of the editing flowchart according to the second embodiment of the present invention.
Figure 5C:
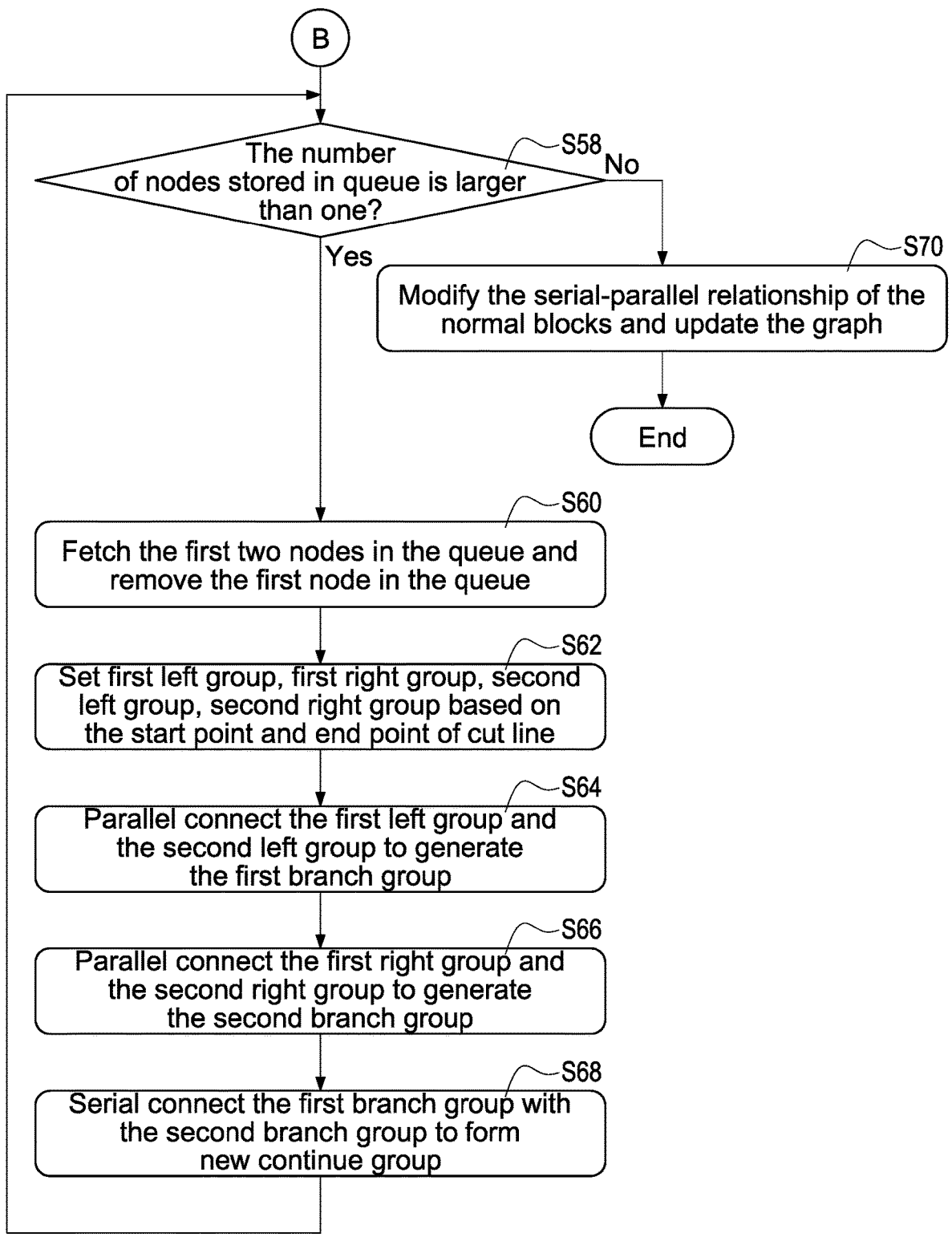
FIG. 5C is the third part of the editing flowchart according to the second embodiment of the present invention.

FIGS. 5A to 5C respectively show the first flowchart, the second flowchart and the third flowchart of the editing method. Hereinafter the detailed steps for the editing method will be described with also reference to FIGS. 3A to 3G.

At first the editor receives a first external operation of user to enter the editing mode (step S30). In one embodiment, the user keeps pressing the button of mouse to execute the first external operation. In another embodiment, the user presses a special function key of the keyboard to execute the first external operation.

In the editing mode, according to user operation, the editor selects the endpoint of any normal block 2 on the graph 1 as the source node 41 (step S32). In one embodiment, the editor may set the endpoint corresponding to the current location of the computer cursor (such as mouse pointer) as source node 41, but this is not limitation for the present invention.

After ensuring the source node 41, the editor clears the record of all nodes in queue Q (step S34). Afterward, the editor receives a second external operation of user to move the cursor from the source node 41 and calculates the moving distance of the cursor (step S36). In one embodiment, user drags the mouse to execute the second external operation. In another embodiment, user presses arrow key of the keyboard to execute the second external operation.

After step S36, the editor further determines whether the moving distance is larger than a preset threshold (step S38). The editor performs no further action if the moving distance is not larger than the preset threshold and the editor repeats above step before exiting the editing mode. The editor adds the source node 41 into queue Q (step S40) if the moving distance is larger than the preset threshold. More particularly, in step S40, the editor adds the number of the endpoint on which the source node hovers into the queue Q from back end of the queue Q and then sets the source node 41 as the current node for the cursor.

In this embodiment, the editor determines the moving direction of the cursor from the source node based on the second external operation of user, namely, determines whether the moving direction of the cursor is upward or downward (step S42). If the cursor, controlled by user, is moved downward with respect to the current node and the moving distance is larger than the preset threshold, the editor only calculates and displays one or more effective candidate node 42 below the current node (step S44). On the contrary, if the cursor is moved upward with respect to the current node and the moving distance is larger than the preset threshold, the editor only calculates and displays one or more effective candidate node 42 above the current node (step S46).

As mentioned above, the effective candidate node 42 in this present invention is the endpoint that the editor finds no short circuit for any normal block when the current node is connected to this endpoint.

The editor keeps determining whether it receives a third external operation sent by user to exit the editing mode (step S48). In one embodiment, user releases mouse button to execute the third external operation. In another embodiment, user presses again the special function key of computer keyboard to execute the third external operation. If the editor does not receive the third external operation, the editor performs the steps shown in FIG. 5B. If the editor receives the third external operation, the editor performs the steps shown in FIG. 5C to exit the editing mode.

As shown in FIG. 5B, the editor determines whether user moves the cursor by performing the second external operation and user hovers the cursor at any candidate node 42 (step S50). If user moves the cursor and the cursor hovers at any candidate node 42, the editor adds the candidate node 42 into queue Q to convert the candidate node 42 into connected node (step S52). On the contrary, if the cursor does not hover on any candidate node 42, the editor does not perform any further action.

More particularly, in step S52, if the cursor is moved and hovers at any candidate node 42 by user operation, the editor stores the number of the endpoint corresponding to the location of the candidate node 42 into the queue Q from the back end of the queue Q such that the candidate node 42 is recorded as connected node 43.

Besides, the editor further determines whether the cursor is controlled by user to move backward and leave any connected node 43 (step S54). When the editor determines that the cursor is moved backward (namely moving toward the source node 41) and leave a connected node 43, the editor converts the connected node 43 into the candidate node 42 and removes the candidate node 42 from the queue Q from the back end of the queue Q (step S56).

More particularly, in step S56, the editor removes the number of the endpoint corresponding to the location of the candidate node 42 from the queue Q.

Before exiting the editing mode, the editor returns to step S42 to continually calculate and display currently available candidate node 42, convert the candidate node 42 passed by the cursor into connected node 43 and convert (resume) the connected node 43 (not passed by the cursor) back to the candidate node 42.

As shown in FIG. 5C, if the editor exits the editing mode based on the third external operation of user, then the editor first fetches the queue Q and determines whether the number of nodes stored in the queue Q is larger than one (step S58). In the present invention, if the number of nodes stored in the queue Q is larger than one (namely at least two nodes), then the editor may construct the cut lines 31-33 as shown in FIGS. 3E to 3G based on these two nodes. If the number of nodes stored in the queue Q is not larger than one (namely only one node or no node), the editor ends the construction of the continuous vertical line.

In step S58, if the number of nodes stored in the queue Q is larger than one, the editor fetches the first two nodes in the queue Q and removes the record of the first node in the queue Q (step S60). More particularly, the editor uses the "peek" command to check the first two nodes in the queue Q from the front end of the queue Q, and uses the two nodes as the start point and endpoint for the cut line. The editor uses the "pop" command to remove the first node in the queue Q from the front end of the queue Q to set the endpoint of the current cut line as the start point of the next cut line, or as the end node of the continuous vertical line.

After step S60, the editor constructs a first cut line based on the fetched two nodes, sets one or more normal block 2 on the left side of the start point of the cut line as the first left group and sets one or more normal block 2 on the right side of the start point of the cut line as the first right group. The editor further sets one or more normal block 2 on the left side of the endpoint of the cut line as the second left group, and sets one or more normal block 2 on the right side of the endpoint of the cut line as the second right group (step S62). In other word, based on the start point and the endpoint of the cut line, the editor separates the continue blocks of the graph 1 into left group and right group in step S62.

After step S62, the editor further parallel connects the first left group and the second left group to generate the first branch (parallel) group (step S64), and parallel connects the first right group and the second right group to generate the second branch (parallel) group (step S66).

More particularly, in step S64, the editor parallel connects the first left group and the second left group to generate the new branch group based on the common start point (the leftmost part of the graph 1) and the cut line. In step S66, the editor parallel connects the first right group and the second right group to generate the new branch group based on the common endpoint (the rightmost part of the graph 1) and the cut line.

After step S66, the editor further serial connects the first branch group with the second branch group to form new continue (serial) group (step S68).

Afterward, the editor is back to step S58 to determine whether the number of the node remaining in the queue Q is larger than one after the above-mentioned cut line is generated. The editor re-executes steps S60 to S68 to generate the next cut line if the number of the nodes remaining in the queue Q is larger than one. The editor modifies the serial-parallel relationship of the normal blocks in the graph 1 based on the one or more new branch (parallel) group, and the editor then updates and displays the graph 1 (step S70).

The above example is exemplified with pointer of computer mouse. However, the editing method of the present invention can also be implemented by computer keyboard.

Refer also to FIGS. 6A to 6D, which show the first construction operation to the fourth construction operation for the continuous vertical line according to the third embodiment.

Figure 6A:
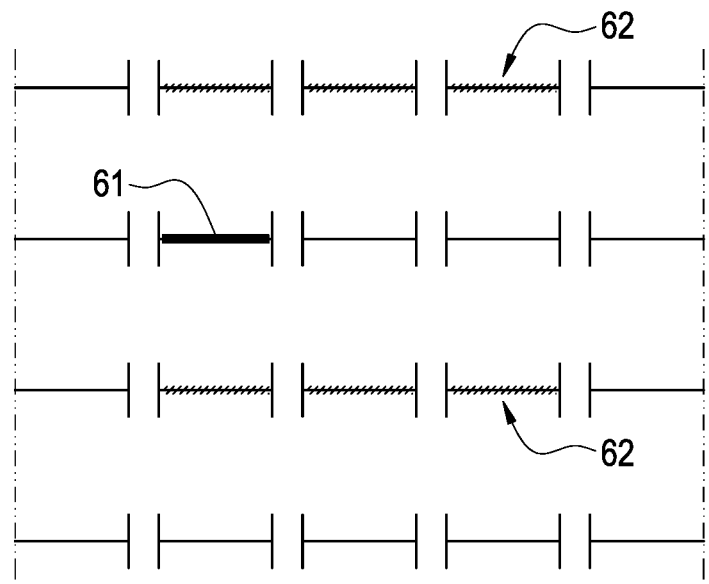
FIG. 6A shows the first construction operation for the continual vertical line according to the third embodiment of the present invention.

As shown in FIG. 6A, after entering the editing mode, user may operate the arrow key of keyboard to move cursor of the editor and select one of the endpoints as the source node 61. After user selects the source node 61, the editor may display, after calculation, one or more effective candidate nodes 62 around the source node 61, where the source node 61 and the candidate nodes 62 may be represented with different colors or different shapes.

Figure 6B:
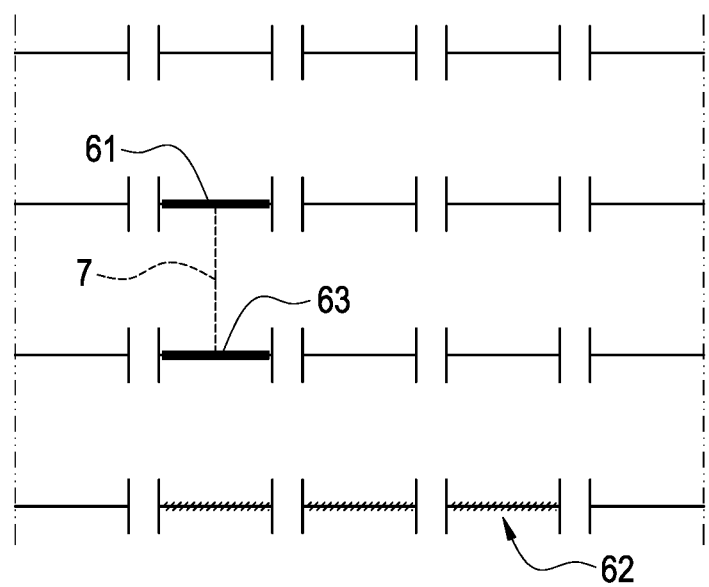
FIG. 6B shows the second construction operation for the continual vertical line according to the third embodiment of the present invention.
Figure 6C:
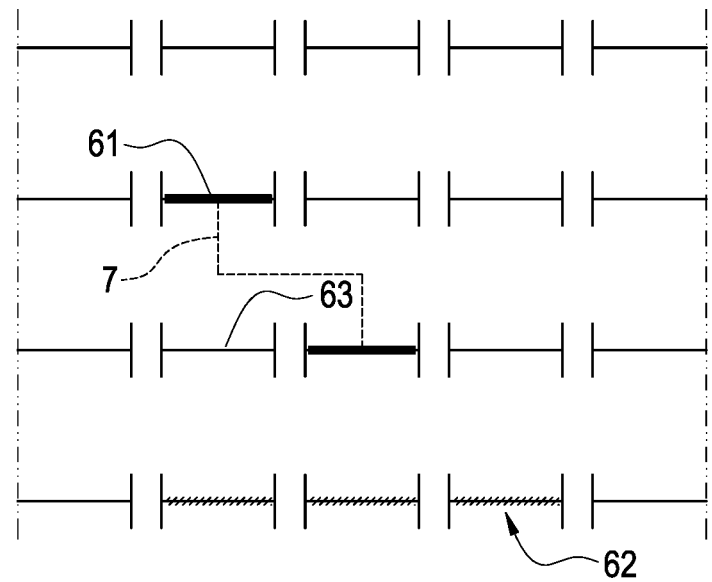
FIG. 6C shows the third construction operation for the continual vertical line according to the third embodiment of the present invention.

Afterward, as shown in FIGS. 6B and 6C, user may use arrow key of keyboard to move the cursor from the source node 61 to any candidate node 62. The editor converts the candidate node 62 on which the cursor hovers into connected node 63 and generates a pre-connection line 7 between the two nodes 61 and 63. When one candidate node 62 is converted into connected node 63, the editor further calculates and displays one or more effective candidate node 62 around the connected node 63.

Figure 6D:
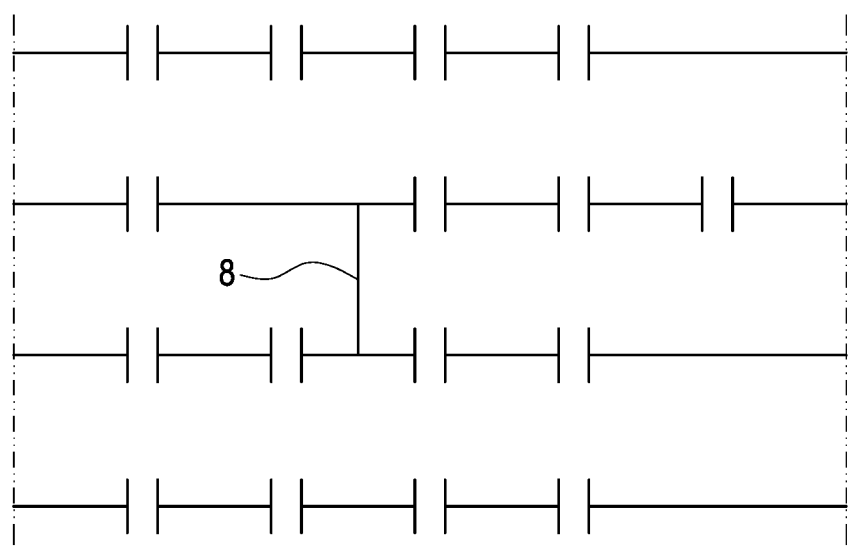
FIG. 6D shows the fourth construction operation for the continual vertical line according to the third embodiment of the present invention.

Finally, as shown in FIG. 6D, when user sends command through keyboard to control the editor exit the editing mode, the editor generates the continuous vertical line 8 based on the source node 61 and one or more connected node 63, and modifies the serial-parallel relationship of the normal blocks in the graph 1 based on the continuous vertical line 8. The editor updates and displays the graph 1.

By above editing method of the present invention, user only needs one-time operation by mouse, keyboard or touch pad to directly generate a continuous vertical line in graph, thus fast modify the relationship among normal blocks. User may use the editor of visual programming language more efficiently.

Although the present invention has been described with reference to the preferred embodiment thereof, it will be understood that the present invention is not limited to the details thereof. Various substitutions and modifications have been suggested in the foregoing description, and others will occur to those of ordinary skill in the art. Therefore, all such substitutions and modifications are intended to be embraced within the scope of the present invention as defined in the appended claims.

What is claimed is:

1. A method for editing continual vertical line of visual programming language, the method applied to an editor operated on a computer, the editor providing a serial-parallel graph comprising a plurality of normal blocks, wherein each of the normal blocks respectively has two endpoints, and the method comprising:
   a) receiving a first external operation to enter an editing mode;
   b) obtaining a source node on the serial-parallel graph when entering the editing mode, and setting the source node as a current node, wherein the source node is an endpoint of one of the normal blocks;
   b1) adding the source node to a queue of the editor;
   b2-1) calculating a moving distance from the current node;
   b2-2) determining whether the moving distance is larger than a threshold;
   c) when the moving distance is larger than the threshold, displaying at least one candidate node around the current node, wherein the at least one candidate node is an endpoint of at least one of the normal blocks around the current node;
   d) receiving a second external operation to connect the current node to one of the at least one candidate nodes;
   e) converting the connected candidate node into a connected node, and generating and displaying a pre-connection line connecting the current node and the connected node;
   f) determining whether a third external operation for exiting the editing mode is received;
   g) setting the connected node as the current node and repeating the step c) to the step f) before exiting the editing mode;
   h) generating a continuous vertical line connecting the source node and at least one of the connected nodes when exiting the editing mode; and
   i) modifying a serial-parallel relationship of the normal blocks based on the continuous vertical line and updating the serial-parallel graph.

2. The method in claim 1, wherein the first external operation is performed by continuously pressing a button of a mouse of the computer, the second external operation is performed by moving the mouse for dragging a pointer, the third external operation is performed by releasing the button of the mouse.

3. The method in claim 1, wherein the first external operation is performed by pressing a special function key of a keyboard of the computer, the second external operation is performed by pressing an arrow key of the keyboard, and third external operation is performed by pressing again the special function key of the keyboard.

4. The method in claim 1, wherein in the step h), the continuous vertical line is generated based on the source node stored in the queue of the editor and the connected candidate nodes stored in the queue.

5. The method in claim 1, wherein in the step i), the serial-parallel relationship of the normal blocks is modified based on the source node stored in the queue of the editor and the connected candidate nodes stored in the queue.

6. The method in claim 5, wherein the step i) comprises following sub-steps:
   i1) determining whether a number of the nodes stored in the queue is larger than one;
   i2) fetching first two nodes in the queue and then removing a first node in the queue when the number of the nodes stored in the queue is larger than one;
   i3) after the sub-step i2), generating a cut line based on the two fetched nodes, setting one or more normal block on a left side of a start point of the cut line as a first left group, setting one or more normal block on a right side of the start point of the cut line as a first right group, setting one or more normal block on a left side of an endpoint of the cut line as a second left group, setting one or more normal block on a right side of the endpoint of the cut line as a second right group;
   i4) after the sub-step i3), parallel connecting the first left group and the second left group to form a first branch group;
   i5) after the sub-step i3), parallel connecting the first right group and the second right group to form a second branch group;
   i6) serially connecting the first branch group and the second branch group to form a new continue group;
   i7) after the sub-step i6), repeating the sub-steps) to i6); and
   i8) modifying the serial-parallel relationship of the normal blocks based on one or more new continue group and updating the serial-parallel graph if the number of the nodes stored in the queue is not larger than one.

7. The method in claim 6, wherein the sub-step i2) the first two nodes in the queue are fetched with peek command to obtain the first two nodes as the start point and the endpoint of the cut line, the first node in the queue is removed with pop command.

8. The method in claim 1, further comprising a step b0) before the step b1): clearing the queue.

9. The method in claim 1, further comprising a step b3) after the step b): determining a moving direction departing from the source node;
   wherein at least one of the candidate nodes above the current node is displayed when the moving direction is upward;
   wherein at least one of the candidate nodes below the current node is displayed when the moving direction is downward.

10. The method in claim 1, wherein the candidate node is an effective candidate node not causing short circuit of one or more normal block in the serial-parallel graph.

11. The method in claim 1, wherein the candidate node is displayed with dashed line, and the connected node is displayed with solid line.

12. The method in claim 1, wherein the candidate node is displayed with a first color, and the connected node is displayed with a second color.

13. The method in claim 1, wherein in the step e), the connected candidate node is added to the queue of the editor to convert the connected candidate node into the connected node.

14. The method in claim 13, wherein in the step e), the candidate node is added to the queue from a back end of the queue when the editor receives the second external operation and a cursor hovers on any candidate node.

15. The method in claim 14, further comprising following steps after the step e):
   e1) determining whether the cursor is moved back and leaves the connected node; and
   e2) resuming the connected node to the candidate node and removing the candidate node from the back end of the queue when the cursor is moved back and leaves the connected node.

* * * * *